(12) United States Patent
Yuan et al.

(10) Patent No.: US 8,935,564 B2
(45) Date of Patent: Jan. 13, 2015

(54) METHOD FOR BACKING UP USER INFORMATION AND APPARATUS IN STANDBY SERVICE NODE FOR BACKING UP USER INFORMATION

(75) Inventors: Bo Yuan, Shenzhen (CN); Liang Fan, Shenzhen (CN); Chengxu Zhu, Shenzhen (CN); Jian Guo, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 255 days.

(21) Appl. No.: 13/501,606

(22) PCT Filed: May 12, 2010

(86) PCT No.: PCT/CN2010/072671
§ 371 (c)(1),
(2), (4) Date: Apr. 12, 2012

(87) PCT Pub. No.: WO2010/145357
PCT Pub. Date: Dec. 23, 2010

(65) Prior Publication Data
US 2012/0204058 A1    Aug. 9, 2012

(30) Foreign Application Priority Data
Oct. 21, 2009    (CN) .......................... 2009 1 0208906

(51) Int. Cl.
*G06F 11/07* (2006.01)
*H04L 12/26* (2006.01)
*H04L 12/24* (2006.01)

(52) U.S. Cl.
CPC ........ *H04L 43/0811* (2013.01); *H04L 41/0663* (2013.01); *H04L 43/10* (2013.01)
USPC ........................... 714/4.12; 714/4.1; 714/5.11

(58) Field of Classification Search
USPC ................................ 714/4.1, 4.11, 4.12, 5.11
See application file for complete search history.

(56) References Cited

U.S. PATENT DOCUMENTS

| | | | |
|---|---|---|---|
| 6,148,410 A * | 11/2000 | Baskey et al. ................ | 714/4.11 |
| 6,643,795 B1 * | 11/2003 | Sicola et al. ................. | 714/6.21 |
| 6,910,148 B1 * | 6/2005 | Ho et al. ........................ | 714/4.4 |
| 6,944,785 B2 * | 9/2005 | Gadir et al. ................... | 714/4.11 |
| 7,139,926 B1 * | 11/2006 | Madhav et al. ............... | 714/4.11 |
| 7,266,715 B1 * | 9/2007 | Bazzinotti et al. ............. | 714/4.4 |
| 7,275,175 B2 * | 9/2007 | Cardona et al. ............... | 714/4.11 |
| 7,518,987 B2 * | 4/2009 | Biswas et al. ................. | 370/221 |
| 7,689,722 B1 * | 3/2010 | Timms et al. ................. | 709/249 |
| 8,761,001 B2 * | 6/2014 | Mao et al. ..................... | 370/220 |
| 2003/0147344 A1 | 8/2003 | Stewart et al. | |

* cited by examiner

*Primary Examiner* — Joseph Schell
(74) *Attorney, Agent, or Firm* — Ling Wu; Stephen Yang; Ling and Yang Intellectual Property

(57) ABSTRACT

A method and apparatus for backing up user information are disclosed. The method includes: establishing a plurality of selection switch protocol groups between a same port of a standby service node and ports of a plurality of main service nodes respectively; the standby service node regularly receiving user information of access users from the ports of the plurality of main service nodes, and storing the user information to a main control unit of the standby service node; keeping a detection relation between the same port of the standby service node and the ports of the plurality of main service nodes; the standby service node sending to an interface unit of the standby service node the user information of the access user of that port stored in the main control unit, and according to the selection switch protocol, switching the same port of the standby service node to be main.

10 Claims, 4 Drawing Sheets

METHOD FOR BACKING UP USER INFORMATION AND APPARATUS IN STANDBY SERVICE NODE FOR BACKING UP USER INFORMATION

TECHNICAL FIELD

The present invention relates to the communication field, and in particular, to a method and apparatus for backing up user information.

BACKGROUND OF THE RELATED ART

Along with the quantity of the broadband users accessing a service node (abbreviated as SN) more and more, the reliability requirement to the broadband by the broadband user is higher and higher, so the requirement to the access of user backup by the operator is also higher and higher.

The user backup technology used in the related art is a dual module hot spare technology, and that technology enables an access node (abbreviated as AN) to access dual SNs by adopting dual uplinks; wherein, one SN acts as main and the other SN acts as standby, the port of the main SN and the port of the standby SN are one-to-one correspondence, and the main and standby SNs adopt the virtual router redundancy protocol (abbreviated as VRRP) and the bidirectional forwarding detection (abbreviated as BFD) technologies to switch the state. The main SN synchronizes the access user information to the standby SN, and after receiving the user information transferred by the main SN, the standby SN sends that user information to an interface module in the form of a user table at once. When a link of accessing the users under the port of the main SN has a fault, the standby SN is switched to be the main SN, the user flow is switched, and the flow is forwarded through the standby SN.

However, according to the related art, it is unable to back up different ports of a plurality of main SNs to one same port of the standby SN. The reason causing this situation is that, on the one hand, after receiving the user information synchronized by the main SN, the standby SN sends the user information to the interface unit in the form of the user table at once, while the storage size of the user table of the interface unit is fixed, and if a large amount of data of a plurality of ports is backed up to the one same port of the standby SN, the storage of the user table of the interface unit of the standby SN will overflow which causes backup failure; on the other hand, if a plurality of the ports are backed up to one same port and a main control module sends the user table to the interface module, then when a plurality of ports have faults, the port flow on the standby SN will be too large, so it will cause a flow alarm.

Therefore, aiming at the above-mentioned problem that it is unable to back up different ports of a plurality of main SNs to one same port of the standby SN which results in increasing of the cost of the network construction, it has not put forward an effective solution in related art yet.

CONTENT OF THE INVENTION

The main objective of the present invention is to provide a method and apparatus for backing up user information, to solve the problem that the related art is unable to back up different ports of a plurality of main SNs to one same port of the standby SN which results in increasing the cost of the network construction.

According to one aspect of the present invention, a method for backing up user information is provided.

The method for backing up the user information according to the present invention comprises: establishing a plurality of selection switch protocol groups between a same port of a standby service node and ports of a plurality of main service nodes respectively; the standby service node regularly receiving user information of access users from the ports of the plurality of main service nodes, and storing the user information to a main control unit of the standby service node; keeping a detection relation between the same port of the standby service node and the ports of the plurality of main service nodes; and under a situation of detection failure of the same port of the standby service node and one of the ports of the plurality of main service nodes, that is, one main service node of the plurality of main service nodes having a fault or the port being unreachable, the standby service node sending to an interface unit of the standby service node the user information of the access users of the port of the faulted or port-unreachable main service node stored in the main control unit, and according to the selection switch protocol, switching the port of the standby service node to be main.

Preferably, at least one of the following ways is used to detect running states of the ports of the plurality of main service nodes: a bidirectional forwarding detection protocol and an Ethernet operation administration and maintenance protocol.

Preferably, the selection switch protocol refers to: a virtual router redundant protocol.

Preferably, under a situation that a slot number and a port number to which the same port of the standby service node belongs is inconsistent with a slot number and a port number to which the main service node belongs, when performing an access user authorization, an evasion processing to the slot number and the port number in port identification information of a network access server port is performed.

Preferably, the method further comprises: for the faulted or port-unreachable main service node, when the fault is recovered or the port is reachable again, switching the port of the main service node of which the fault is recovered or the port is reachable again to be main.

According to another aspect of the present invention, an apparatus for backing up user information is further provided.

The apparatus for backing up the user information according to the present invention comprises: an establishment module, configured to establish a plurality of selection switch protocol groups between a same port of a standby service node and ports of a plurality of main service nodes respectively; a receiving module, configured to regularly receive user information of access users from the ports of the plurality of main service nodes; a storage module, configured to store the user information received by the receiving module to a main control unit; a detection module, configured to keep a detection relation between the same port of the standby service node and the ports of the plurality of main service nodes; a processing module, configured to, under a situation that the detection module detects detection failure of the same port of the standby service node and one of the ports of the plurality of main service nodes, that is, one main service node of the plurality of main service nodes having a fault or the port being unreachable, send to an interface unit of the standby service node the user information of the access users of the port of the faulted or port-unreachable main service node stored by the storage module and generate a route, and switch the same port of the standby service node to be main according to the selection switch protocol, and associate with a sending module when the equipment is switched to be main; and the sending module, configured to send the user information to the standby service node.

Preferably, the detection module detects running states of the ports of the plurality of main service nodes by using at least one of the following ways: a bidirectional forwarding detection protocol and an Ethernet operation administration and maintenance protocol.

Preferably, the selection switch protocol used by the processing module refers to: a virtual router redundant protocol.

Preferably, the apparatus further comprises: an evasion processing module, configured to, under a situation that a slot number and a port number to which the same port of the standby service node belongs is inconsistent with a slot number and a port number to which the main service node belongs, when performing an access user authorization, perform an evasion processing to the slot number and the port number in port identification information of a network access server.

Preferably, the apparatus further comprises: a backup processing module, configured to, for the faulted or port-unreachable main service node, when the fault is recovered or the port is reachable again, switch the port of the main service node of which the fault is recovered or the port is reachable again to be main.

Compared to the related art, according to the above-mentioned technical scheme of the present invention, the standby SN receives and backs up the user information of the users in advance, and when the main SN runs abnormally or the downlink forwarding from the SN to the user has a fault, the standby SN sends the access user information received in advance to the interface unit and generates the user route, which can back up different ports of a plurality of main SNs to the same port of the same standby SN and prevents storage of the user table of the interface unit of the standby SN from overflowing; therefore, the number of backup equipments required when backing up the user information is saved effectively, thus achieving the objective of saving the cost of network construction.

BRIEF DESCRIPTION OF DRAWINGS

The accompanying drawings illustrated herein are used to provide further understanding for the present invention, which constitute a part of the present application, and the illustrative embodiment and the description of the present invention are used to explain the present invention, rather than constituting an inappropriate limitation to the present invention. In the accompanying drawings.

PREFERRED EMBODIMENTS OF THE PRESENT INVENTION

The main idea of the present invention is that, a plurality of main SNs synchronizes in real time the user information of access users requiring backup to a main control unit of one same set of SN (called as standby SN) and distinguishes the user information, and at the moment all main SN user tables on the standby SN are not sent to an interface unit; and when the state of a certain SN or a certain downlink of the SN is abnormal, the user table of the access users on the faulted SN or link is sent to the interface unit, and a user route is issued.

In order to make the objective, technical scheme and advantage of the present invention more clear, the present invention is further illustrated in detail in combination with the accompanying drawings and embodiments hereinafter.

According to an embodiment of the present invention, a method for backing up user information is provided.

Figure 1:
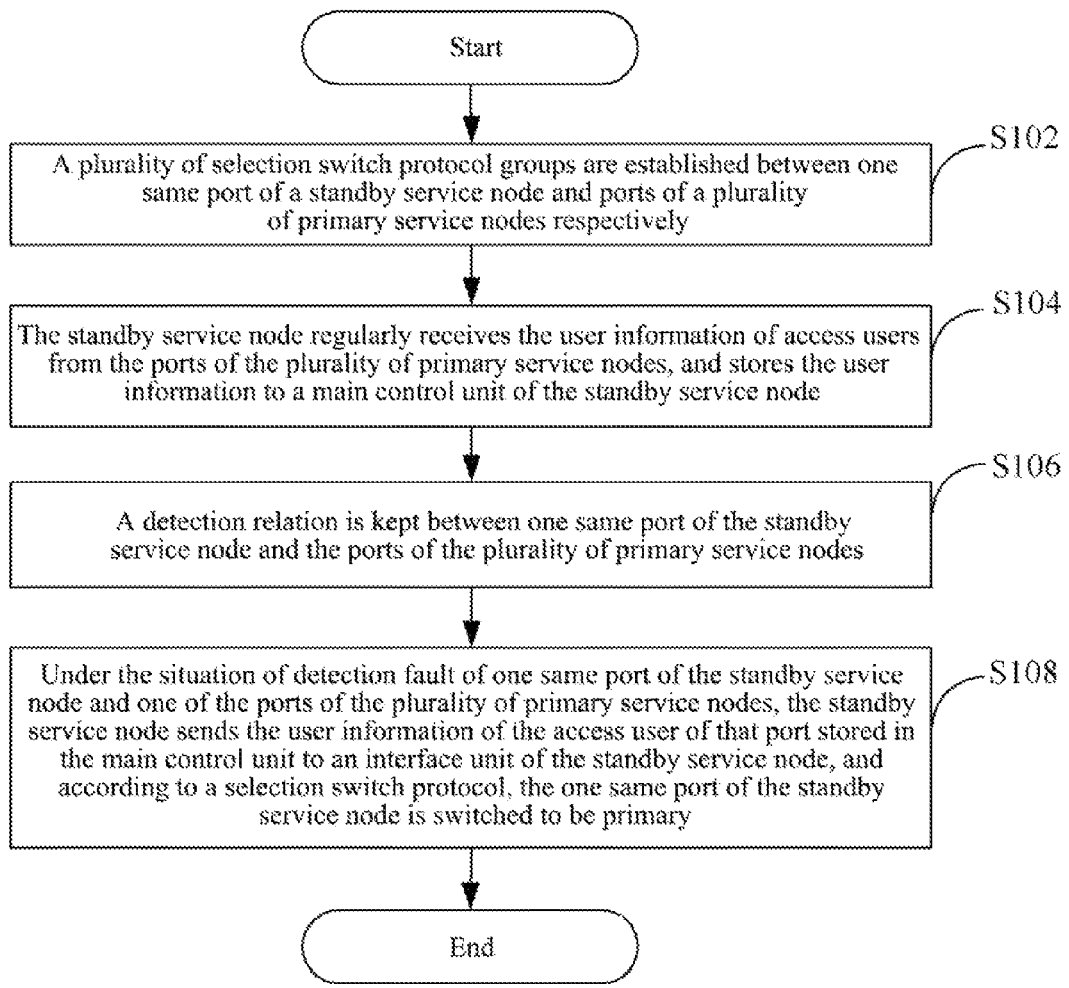
FIG. 1 is a flow chart of a method for backing up user information according to an embodiment of the present invention.

FIG. 1 is a flow chart of a method for backing up user information according to an embodiment of the present invention. As shown in FIG. 1, the method includes the following steps:

in step S102, a plurality of selection switch protocol groups are established between a port of a standby service node and ports of a plurality of main service nodes respectively;

in step S104, the standby service node regularly receives the user information of access users from the ports of the plurality of main service nodes, and stores the user information to a main control unit of the standby service node;

in step S106, a detection relation is kept between the port of the standby service node and the ports of the plurality of main service nodes;

in step S108, under a situation of detection failure of the port of the standby service node and one of the ports of the plurality of main service nodes, the standby service node sends the user information of the access users of that port stored in the main control unit to an interface unit of the standby service node, and according to a selection switch protocol, the port of the standby service node is switched to be main.

Figure 2:
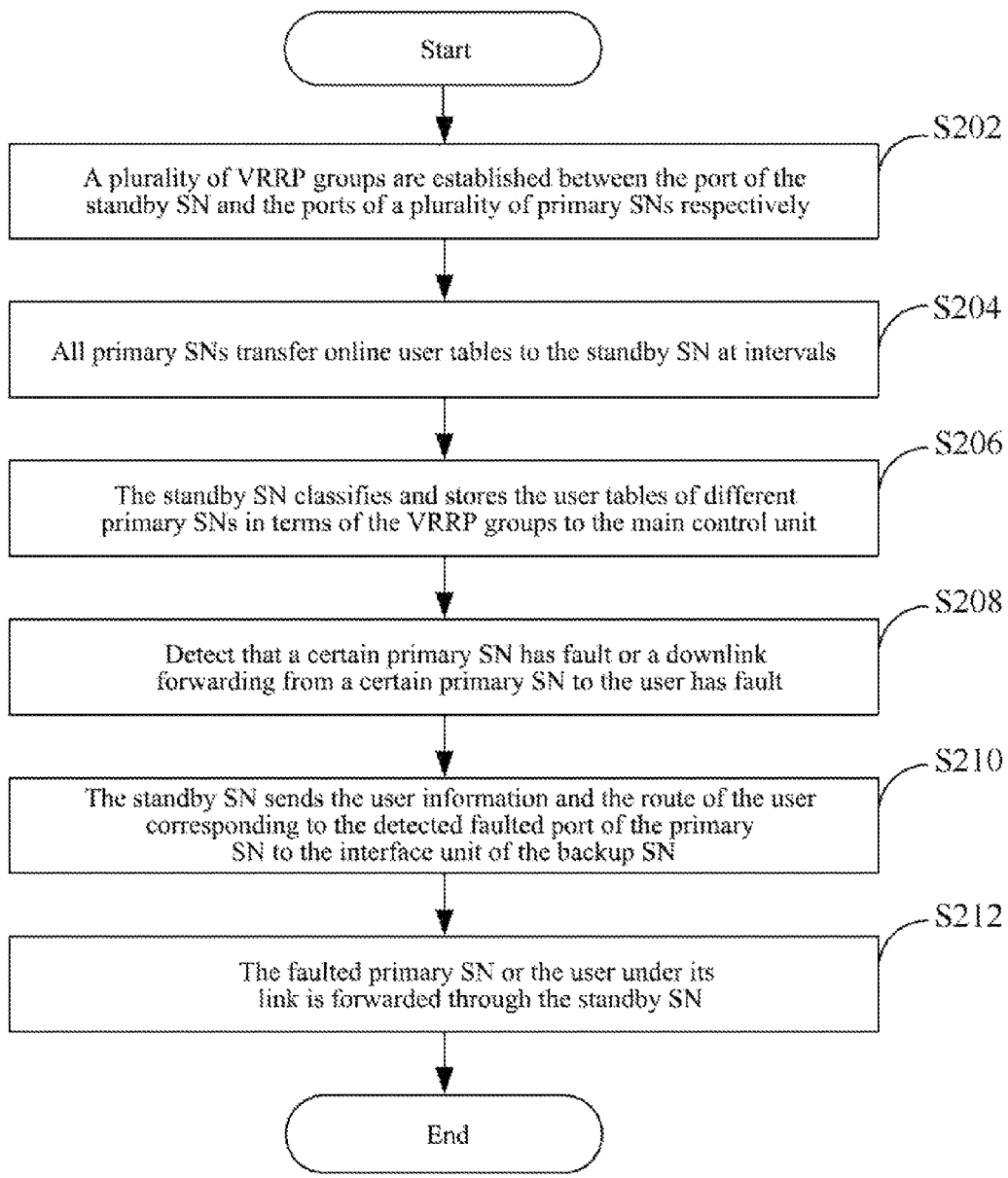
FIG. 2 is a flow chart of a preferable processing scheme of a method for backing up user information according to an embodiment of the present invention.

The details of each above-mentioned processing are described in detail in combination with FIG. 2 hereinafter. FIG. 2 is a flow chart of a preferable processing scheme of a method for backing up user information according to an embodiment of the present invention. As shown in FIG. 2, the method includes the following steps:

in step S202, a plurality of virtual router redundancy protocol (VRRP) groups are established between the port of the standby SN and the ports of a plurality of main SNs respectively;

in step S204, all main SNs transfer the user information of the online users to the standby SN according to the scheduled time;

in step S206, the standby SN classifies and stores the user information of different main SNs to the main control unit according to the VRRP groups, but does not send to the interface unit;

in step S208, it is detected that a certain main SN has a fault or a downlink forwarding from a certain main SN to the user has a fault, and the detection mode herein includes: a bidirectional forwarding detection (abbreviated as BFD) protocol, an Ethernet operation, administration and maintenance (OAM) protocol;

in step S210, the standby SN sends the user information and the route of the users corresponding to the detected faulted port of the main SN to the backup interface unit;

in step S212, the access users of the faulted main SN or its link are forwarded through the standby SN.

Adopting the above-mentioned technical scheme of the present invention to perform the user information backup can back up different ports of the main SN to one same port of the backup SN, which saves the cost of the network construction and enhances the network reliability effectively.

Figure 3:
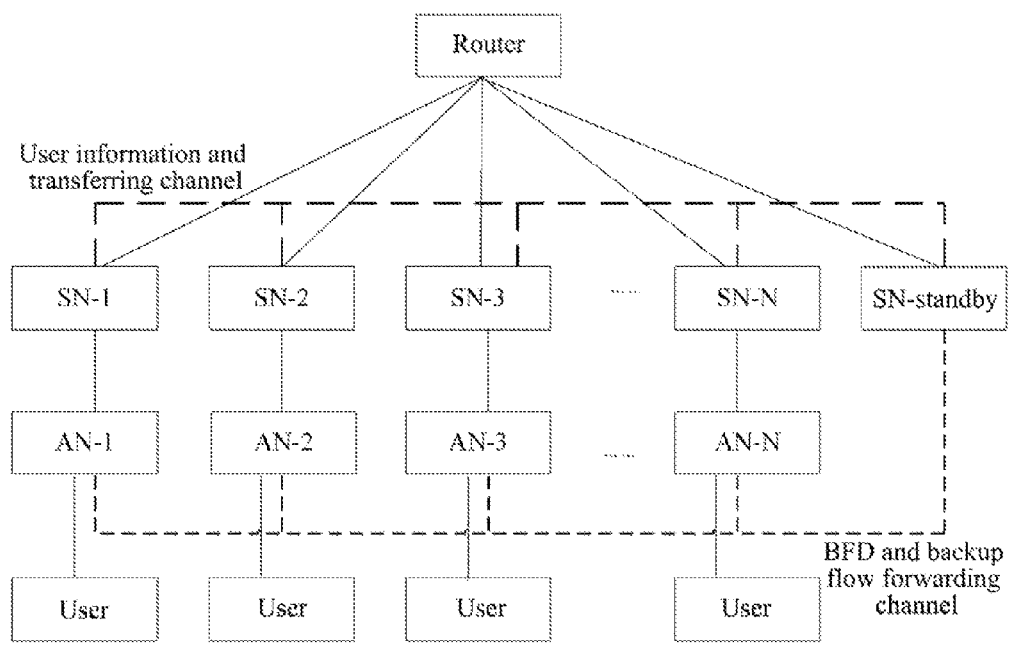
FIG. 3 is a schematic diagram of a network topology according to an embodiment of the present invention.

In particular application, when the main and standby ports perform N:1 backup, they can adopt the way that the slots and the ports accessing by the main and standby SNs are correspondingly consistent (that is, a plurality of the main SNs back up the respective user in the same slot and same port to a same slot and port of the standby SN), and also can adopt the way that the slots and the ports accessing by the main and standby SNs are correspondingly inconsistent (that is, a plurality of the main SNs back up the user in any slot and port to any slot and port of the standby SN). Now it is described in detail in combination with FIG. 3 hereinafter.

Example one: 3 sets of SNs (SN-1, SN-2, SN-3) are backed up to one same set of SN (SN-4), and the users with slot number 1 and port number 1 of 3 main SNs are backed up to port number 1 and slot number 1 of the standby SN-4.

in step 1, different VRRP groups are established between the ports of the users requiring backup of 3 main SNs and one same backup port of the standby SN-4 respectively, and the 2 layers link state are detected by the BFD technology;

in step 2, 3 sets of main SNs access the users, and synchronizingly send the user information of the access user under the respective slot number 1 and port 1 to the standby SN regularly;

in step 3, the standby SN receives these user information, stores the information in the main control unit of the standby SN in the form of the user table, and distinguishes according to the VRRP group IDs associated to the ports requiring backup by the main SN when storing;

wherein, the user table is associated to one same slot and one same port of the standby SN.

In step 4, the link from slot number 1 and port 1 of the SN-1 to the downlink AN has the fault (DOWN), the standby SN-4 detects that the link is DOWN by the BFD, and the state of the corresponding VRRP group is switched. The SN-4 finds out a group of user table of the SN-1 associated in the main control through the VRRP groups, and sends that user table to the interface unit, and generates the user route at the same time; the standby SN-4 synchronizes the user data associated with the VRRP group to the SN-1;

in step 5, the user data of the faulted SN-1 is forwarded through the standby SN-4;

in step 6, the fault of the SN-1 is recovered, the BFD detects that the state of the SN-1 is recovered, the VRRP corresponding to the original faulted port is switched again, the state of the VRRP corresponding to the standby SN-4 is switched to be standby, and the standby SN-4 deletes the user table of the SN-1 corresponding to the VRRP group sent by the interface unit.

In step 7, the link from the slot number 1 and port 1 of the SN-2 to the downlink AN is DOWN, the standby SN-4 detects that the link is DOWN by the BFD, and the state of the corresponding VRRP group is switched. The SN-4 finds out a group of the user table of the SN-2 associated with the main control through the VRRP group, sends that user table to the interface unit, and generates the user route at the same time; and the standby SN-4 synchronizes the user data associated with the VRRP group to the SN-2;

in step 8, the user data of the faulted SN-2 is forwarded through the standby SN-4.

Example two: 3 sets of SNs (SN-1, SN-2, SN-3) are backed up to one same set of SN (SN-4), and the users with slot number 1 and port number 1 of the SN-1, slot number 2 and port number 2 of the SN-2 and slot number 3 and port number 3 of the SN-3 are backed up to port number 1 and slot number 1 of the standby SN.

In step 1, different VRRP groups are established between the ports of the users requiring backup of 3 sets of main SNs and one same backup port of the standby SN-4 respectively, and the 2 layers link state are detected by the BFD;

in step 2, the access users of 3 sets of main SNs (the users with slot number 1 and port number 1 of the SN-1, slot number 2 and port number 2 of the SN-2 and slot number 3 and port number 3 of the SN-3) are backed up to the port number 1 and slot number 1 of the standby SN-4, and synchronizingly send the user information of the access user under the respective backup port to the SN-4 regularly. The range of the virtual local area network (abbreviated as VLAN) of the port of the SN-4 includes all VLANs of the ports of users requiring backup of the main SN, and at the same time, the NAS-PORT-ID of main and standby SNs adopts OPTION82 or PPPoE+ information directly at the remote authentication dial in user service (abbreviated as RADIUS).

In step 3, the SN-4 receives these user information and stores the information in the main control unit of the SN-4 in the form of the user table. Now the SN-4 does not care of the slot number and the port information of the user, while the SN-4 distinguishes according to the VRRP group ID associated to the port requiring backup of the main SN when storing. The user table is associated to one same slot and one same port of the SN-4.

In step 4, the link from slot number 2 and port 2 of the SN-2 to the downlink AN is DOWN, the SN-4 detects that the link is DOWN by the BFD, and the state of the corresponding VRRP group is switched. The SN finds out a group of the user table of the SN-2 associated in the main control through the VRRP group, and sends that user table to the slot number 1 and port number 1 of the SN-4, and generates the user routing at the same time; and the SN-4 synchronizes the user data associated with the VRRP group to the SN-2;

in step 5, the user data of the faulted SN-2 is forwarded through the SN-4;

in step 6, the fault of the SN-2 is recovered, the BFD detects that the state of the SN-2 is recovered, the VRRP corresponding to the original faulted port is switched again, the state of the VRRP corresponding to the SN-4 is switched to be standby, and the SN-4 deletes the user table of the SN-2 corresponding to the VRRP group sent by the interface unit.

In step 7, the link from slot number 3 and port 3 of the SN-3 to the downlink AN is DOWN, the SN-4 detects that the link is DOWN by the BFD, and the state of the corresponding VRRP group is switched. The SN-4 finds out a group of the user table of the SN-3 associated in the main control through the VRRP groups, and sends that user table to the slot number 1 and port number 1 of interface, and generates the user route at the same time; and the SN-4 synchronizes the user data associated with the VRRP group to the SN-3;

in step 8, the user data of the faulted SN-3 is forwarded through the SN-4.

Apparatus Embodiment

According to the embodiment of the present invention, an apparatus for backing up user information is further provided.

Figure 4:
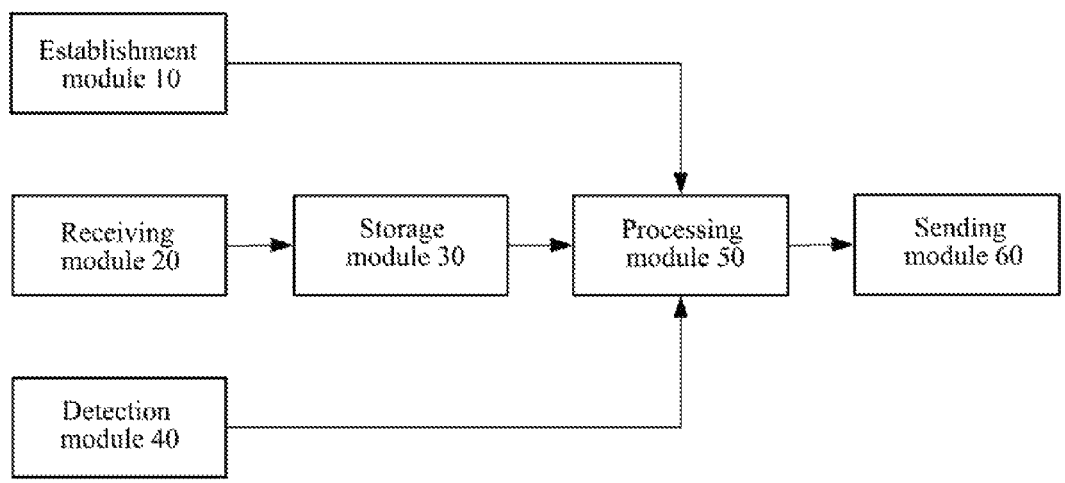
FIG. 4 is a structural block diagram of an apparatus for backing up user information according to an embodiment of the present invention.

FIG. 4 is a structural block diagram of an apparatus for backing up user information according to an embodiment of the present invention. As shown in FIG. 4, the apparatus for backing up the user information according to the embodiment of the present invention includes: an establishment module 10, a receiving module 20, a storage module 30, a detection module 40, a sending processing module 50 and a sending module 60.

Wherein, the establishing module 10 is configured to establish a plurality of selection switch protocol groups between a port of a standby SN and ports of a plurality of main SNs respectively; preferably, the selection switch protocol herein can use the VRRP protocol, and each established VRRP group has a group identification;

the receiving module 20 is configured to receive the user information of access users from the ports of the plurality of main SNs according to the scheduled time;

the storage module 30 is configured to connect to the receiving module 20 and store the user information received by the receiving module 20 to a main control unit; wherein, the storage distinguishing identification can be the VRRP group identification;

the detection module 40 is configured to detect a detection relation between the port of the standby SN and the ports of the plurality of main SNs; wherein, the detection module 40 uses the BFD or OAM protocol to detect;

the processing module 50 connects to the establishment module 10, the storage module 30 and the detection module 40, and is configured to, under the situation that the detection module 40 detects the failure of the port of the standby SN and one of the ports of the main SNs, send the user information of the access user of the port stored by the storage module 30 to an interface unit of the standby SN and generate the route, and switch the port of the standby SN to be main according to the selection switch protocol, and associate with the sending module 60 when the equipment is switched to be main; preferably, the processing module 50 performs backup switching by using the VRRP protocol;

the sending module 60 connects to the processing module 50 and is configured to send the user information to the standby SN.

The apparatus for backing up the user information further includes: an evasion processing module (not shown), which is configured to, under the situation that the slot number and the port number to which the port of the standby SN belongs is inconsistent with the slot number and the port number to which the main SN belongs, when performing the access user authorization, perform an evasion processing to the slot number and the port number in port identification information of a network access server.

In addition, the apparatus for backing up the user information further can include: a backup processing module (not shown), which is configured to, when the fault of the faultled main SN is recovered or the port is reachable again, switch the port of the main SN to be main again.

In particular application process, the specific workflow of the apparatus for backing up the user information according to the embodiment of the present invention can refer to FIG. 1 and FIG. 2, and herein will not go into details.

In conclusion, according to the above-mentioned technical scheme of the present invention, the standby SN receives and backs up the user information of the users in advance, and when the main SN runs abnormally or the downlink forwarding from the SN to the user has a fault, the standby SN sends the access user information received in advance to the interface unit and generates the user route, which can back up different ports of a plurality of main SNs to the same port of the same standby SN and prevents storage of the user table of the interface unit of the standby SN from overflowing; therefore, the number of backup equipments required when backing up the user information is saved effectively, thus achieving the objective of saving the cost of network construction.

The above description is only the preferred embodiments of the present invention and is not intended to limit the present invention. For those skilled in the art, the present invention can have various modifications and variations. All of modifications, equivalents and/or variations without departing from the spirit and essence of the present invention should be embodied in the scope of the appended claims of the present invention.

INDUSTRIAL APPLICABILITY

According to the above-mentioned technical scheme of the present invention, the standby SN receives and backs up the user information of the users in advance, and when the main SN runs abnormally or the downlink forwarding from the SN to the user has a fault, the standby SN sends the access user information received in advance to the interface unit and generates the user route, which can back up different ports of a plurality of main SNs to the same port of the same standby SN and prevents storage of the user table of the interface unit of the standby SN from overflowing; therefore, the number of backup equipments required when backing up the user information is saved effectively, thus achieving the objective of saving the cost of network construction.

What we claim is:

1. A method for backing up user information, comprising:
    establishing a plurality of selection switch protocol groups between a same port of a standby service node and ports of a plurality of main service nodes respectively;
    the standby service node regularly receiving user information of access users from the ports of the plurality of main service nodes, and storing the user information to a main control unit of the standby service node;
    the port of the standby service node and the ports of the main service nodes detecting operational states in each other; and
    when detecting that the operation of any one of the main service nodes fails or detecting that any of the ports of the main service nodes is unreachable, the standby service node sending to an interface unit of the standby service node user information of the access users of the failed main service node or the unreachable port of the main service node from the main control unit of the standby service node, and the standby service node, according to the selection switch protocol, switching the port of the standby service node to be main.

2. The method according to claim 1, further comprising:
    detecting running states of the ports of the plurality of main service nodes by using at least one of the following ways:
    a bidirectional forwarding detection protocol and an Ethernet operation administration and maintenance protocol.

3. The method according to claim 1, wherein, the selection switch protocol refers to: a virtual router redundant protocol.

4. The method according to claim 1, further comprising:
    under a situation that a slot number and a port number to which the same port of the standby service node belongs is inconsistent with a slot number and a port number to which the main service node belongs, when performing an access user authorization, performing an evasion processing to the slot number and the port number in port identification information of a network access server.

5. The method according to claim 1, further comprising:
    for the failed or port-unreachable main service node, when the failure is recovered or the port is reachable again, switching the port of the main service node of which the failure is recovered or the port is reachable again to be main.

6. An apparatus in a standby service node for backing up user information, comprising:
    a processor; and a storage device for storing computer executable instructions that when executed by the processor cause the processor to perform the steps in following modules:

an establishment module, configured to establish a plurality of selection switch protocol groups between a same port of a standby service node and ports of a plurality of main service nodes respectively;

a receiving module, configured to regularly receive user information of access users from the ports of the plurality of main service nodes;

a storage module, configured to store the user information received by the receiving module to a main control unit;

a detection module, configured for the port of the standby service node to detect operational states in the ports of the main service nodes; wherein the ports of the main service nodes also detect an operational state in the port of the standby service node;

a processing module, configured to, under a situation that the detection module detects that the operation of any one of the main service nodes fails or the detection module detects that any of the ports of the main service nodes is unreachable, send to an interface unit of the standby service node user information of the access users of the failed main service node or the unreachable port of the main service node from the main control unit and generate a route, and switch the same port of the standby service node to be main according to the selection switch protocol, and associate with a sending module when the port is switched to be main; and wherein the sending module is configured to send the user information to the standby service node.

7. The apparatus according to claim 6, wherein, the detection module detects running states of the ports of the plurality of main service nodes by using at least one of the following ways:

a bidirectional forwarding detection protocol and an Ethernet operation administration and maintenance protocol.

8. The apparatus according to claim 6, wherein, the selection switch protocol used by the processing module refers to: a virtual router redundant protocol.

9. The apparatus according to claim 6, further comprising:

an evasion processing module, configured to, under a situation that a slot number and a port number to which the same port of the standby service node belongs is inconsistent with a slot number and a port number to which the main service node belongs, when performing an access user authorization, perform an evasion processing to the slot number and the port number in port identification information of a network access server.

10. The apparatus according to claim 6, further comprising:

a backup processing module, configured to, for the failed or port-unreachable main service node, when the failure is recovered or the port is reachable again, switch the port of the main service node of which the failure is recovered or the port is reachable again to be main.

* * * * *